(12) United States Patent
Assaker et al.

(10) Patent No.: US 9,977,841 B1
(45) Date of Patent: May 22, 2018

(54) SYSTEM AND METHOD OF VIRTUAL DETERMINATION DESIGN ALLOWABLES FOR COMPOSITE MATERIALS

(71) Applicants: e-Xstream engineering SA, Mont-Saint-Guibert (BE); MSC.Software Corporation, Newport Beach, CA (US); e-Xstream engineering (L) sàrl, Hautcharage (LU)

(72) Inventors: Roger Assaker, Bonnert (BE); Benoit Bidaine, Saive (BE); Laurent Adam, Esneux (BE); Jean-Sebastien Gerard, Ottignies (BE); Leo Kilfoy, Foothill Ranch, CA (US)

(73) Assignees: e-Xstream engineering SA, Mont-Saint-Guibert (BE); MSC.Software Corporation, Newport Beach, CA (US)

( * ) Notice: Subject to any disclaimer, the term of this patent is extended or adjusted under 35 U.S.C. 154(b) by 747 days.

(21) Appl. No.: 14/135,526

(22) Filed: Dec. 19, 2013

(51) Int. Cl.
*G06F 17/50* (2006.01)

(52) U.S. Cl.
CPC .................................. *G06F 17/50* (2013.01)

(58) Field of Classification Search
CPC ....................................................... G06F 17/50
USPC ............................................................. 703/1
See application file for complete search history.

(56) References Cited

U.S. PATENT DOCUMENTS 8,401,829 B2 * 3/2013 Fertig ................. G06F 17/5018
703/1

* cited by examiner

*Primary Examiner* — Saif A Alhija
(74) *Attorney, Agent, or Firm* — Foley & Lardner LLP

(57) ABSTRACT

A method for determining virtually a set of design allowables for a composite material is disclosed. The method includes receiving information about the composite material and a given set of architectures, available test data of the composite material, and a test matrix identifying desired tests to be performed virtually on the composite material and different set of architectures. Using the material information and available test data, a reverse engineering process is used to determine micromechanical material properties. Finite element models of relevant test specimens are generated according to the test matrix and integrating the micromechanical material properties, and are analyzed. A set of allowables and associated properties is generated based on the finite element analyses results.

19 Claims, 5 Drawing Sheets

SYSTEM AND METHOD OF VIRTUAL DETERMINATION DESIGN ALLOWABLES FOR COMPOSITE MATERIALS

BACKGROUND

The present disclosure relates generally to finite element methods (FEM) and systems. More particularly, the present disclosure relates to determining virtual design allowables for a composite material by using adequate models created using a FEM system.

Predicting the behavior of structural objects is important in order to assess the operability of the structural objects over time. Typically, the behavior is predicted by way of computer simulations of the structural object. One such way of predicting the behavior of structural objects is by using a FEM, which predicts the behavior of the objects in a virtual environment, possibly coupled to a material modeling method that accounts for the properties of the material constituting the objects. A FEM system may be used to generate models of the structural objects and to test the models. A user may use the FEM system to design any type of object that he or she might want to manufacture or display.

The FEM system may allow for creation of finite element models with material, property, load, and constraint attributes. Each attributed finite element model may be transformed into a formatted file suitable for consumption by a finite element solver. The information within the formatted files may be used to generate a set of equations and subsequent solutions of the equations by the finite element solver. The results may then be processed.

In such a system, it is desirable to establish virtually a set of design "allowables," i.e., values of strengths for the composite material constituting the objects represented by the finite element models. The allowables may generally be associated to complementary properties such as stiffness, stress or strain spatial distribution, thermal or electrical conductivity, etc., that are simulated by the FEM system. These allowables may represent the limits within which a structural object made of the composite material can operate safely.

SUMMARY

One embodiment relates to a method for determining virtually a set of design allowables for a composite material and a first architecture. The method includes receiving information about the composite material, available test data of the composite material and a first set of architectures, and a test matrix identifying desired tests to be performed virtually on the composite material with a second set of architectures. The method further includes using a reverse engineering process using the composite material information and available test data to determine micromechanical material properties. The method further includes generating finite element models of relevant test specimens according to the test matrix integrating the micromechanical material properties. The method further includes analyzing the finite element models. The method further includes generating a set of allowables and associated properties based on the finite element analysis results.

Embodiments include a finite element method (FEM) system, having a processing circuit that is configured to receive information about a composite material and a first set of architectures, available test data of the composite material and the first set of architectures, and a test matrix identifying desired tests to be performed virtually on the composite material and a second set of architectures. The processing circuit may use a reverse engineering process using the composite material information and available test data to determine micromechanical material properties for the second architecture. The processing circuit may generate finite element models of relevant test specimens according to the test matrix integrating the micromechanical material properties, analyze the finite element models and generate a set of allowables and associated properties based on the finite element analyses results.

Other embodiments include a computer readable medium containing program instructions, wherein execution of the program instructions by one or more processors of a computer system causes the one or more processors to carry out the steps of, receiving information about the composite material, available test data of the composite material and a first set of architectures, and a test matrix identifying desired tests to be performed virtually on the composite material with a second set of architectures. The processor may further use a reverse engineering process using the composite material information and available test data to determine micromechanical material properties. The processor is configured to generate finite element models of relevant test specimens according to the test matrix integrating the micromechanical material properties. The processor is configured to analyze the finite element models. The processor generates a set of allowables and associated properties based on the finite element analysis results.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Figure 1:
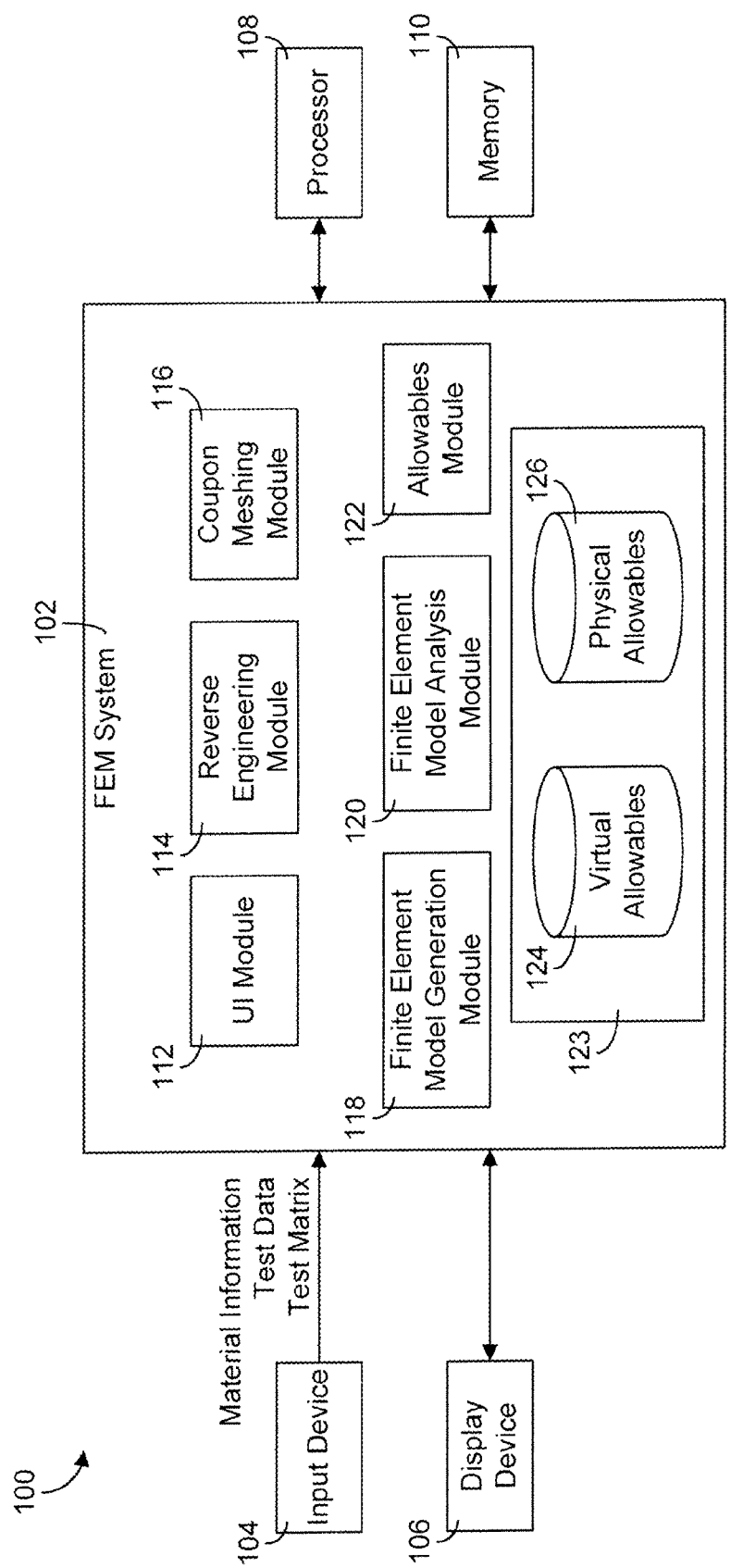
FIG. 1 is a block diagram of a data processing system for use with the systems and methods of the present disclosure, according to an exemplary embodiment.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Referring generally to the figures, systems and methods for determining a virtual set of design allowables for a composite material architecture are shown according to various embodiments. The set of virtual allowables constitutes the limits within which a structural object made of the composite material can operate safely in one embodiment. For example, the virtual allowables may be associated to such material properties as stiffness, strength, stress or strain spatial distribution, thermal or electrical conductivity, or any other property that characterizes the performance of the material in simulation by the FEM system. The virtual allowables may indicate a threshold, tolerance, average value, or other value applicable to the material. The virtual allowables information may be provided to a user via a report or other prepared display. The user may be able to view any material property for the composite material. The composite material may generally include the constituent materials of the model (e.g., a matrix and fibers) and the architecture of the model (e.g., the details of the assembly of the model such as the number of plies, orientation of each ply, configuration of the fibers of each ply, etc.). The set of virtual allowables are determined for one or more particular architectures of the composite material in one embodiment.

Referring to FIG. 1, a block diagram of a data processing system 100 is shown, according to an exemplary embodiment. Data processing system 100 includes a FEM system 102. FEM system 102 may generally be configured to receive generated finite element models (e.g., from a software configured to assist the user in generating the model) of relevant test specimens that are made of composite material. The models may be analyzed by the FEM system 102. FEM system 102 may provide results back to a user. The results may include a set of virtual allowables as described above.

System 100 further includes an input device 104, display device 106, processor 108, and memory 110. System 100 may include other devices such as a network system, wireless or wired communications systems, printers, and other electronic devices.

Input device 104 may be or include a computer with a monitor, keyboard, keypad, mouse, joystick, or other input devices performing a similar function. Input device 104 may include a keyboard including alphanumeric and other keys, and may be connected to FEM system 102 for communicating information and command selections to processor 108. Input device 104 may include a touch screen interface or movement sensing interface that may be combined with, or separated from, display device 106. Input device 104 may include a cursor control device, such as a mouse, trackball, touch screen, motion sensor, or cursor direction keys, for communicating direction information and command selections to processor 108 and for controlling cursor movement on display device 106. Display device 106 may be any type of display (e.g., CRT display, LCD display, etc.) configured to provide a visual output to a user of FEM system 102 and data processing system 100.

FEM system 102 may be a computer system in communication with input device 104, display device 106, processor 108, and memory 110. In one implementation, FEM system 102 may be stored on a non-transitory storage medium that is at the same location as input device 104. In another implementation, FEM system 102 may be located in a different location than input device 104. For example, FEM system 102 may communicate with input device 104 through a network or wirelessly. Accordingly, FEM system 102 may be a cloud-based system that provides software as a service. In another embodiment, FEM system 102 may include processor 108 and memory 110.

Processor 108 may be configured to receive instructions from FEM system 102 and input device 104. Processor 108 is configured to receive data from and calculate results for each of the systems and logics within FEM system 102. Processor 108 may be, but is not limited to being, an Intel® designed processor, AMD® designed processor, Apple® designed processor, QUALCOMM® designed processor, or ARM® designed processor.

Memory (or storage device) 110 may include a memory such as a random access memory (RAM) or other dynamic storage devices. In another implementation, memory 110 may also include non-transitory storage media that is configured to store information regarding, e.g., previously determined allowables. Memory 110 may send or receive data to or from processor 108 and each of the other systems in system 100. In one embodiment, memory 110 may be a remote storage device that stores FEM system 102 data in a different location than FEM system 102 or input device 104. In another embodiment, memory 110 may be located on the same computer system as FEM system 102 or input device 104.

Referring more specifically to FEM system 102, various subsystems are included that may be executed to determine a set of allowables as described in the present disclosure. FEM system 102 may further include various other subsystems not illustrated in the present disclosure for general FEM system functionality. While the present disclosure describes a FEM system, it should be understood that FEM system 102 may alternatively be a computer-aided design (CAD) system, computer-aided engineering (CAE) system, or any other type of similar system in which a user may perform engineering tasks or create designs via computer software.

FEM system 102 is shown to include a UI module 112. UI module 112 may be configured to generate a user interface to display to a user on display device 106. For example, upon determining virtual allowables, UI module 112 may receive the allowables information and generate a report for display on display device 106.

In one embodiment, the report may be compatible with existing software. For example, the report may be generated in a .pdf format, may be generated in a spreadsheet (e.g., .xls) format, or any other format suitable for display on any type of software (e.g., Microsoft Excel). In another embodiment, UI module 112 may generate a display for a system associated with FEM system 102, a CAD or CAE system, or otherwise.

Figure 4:
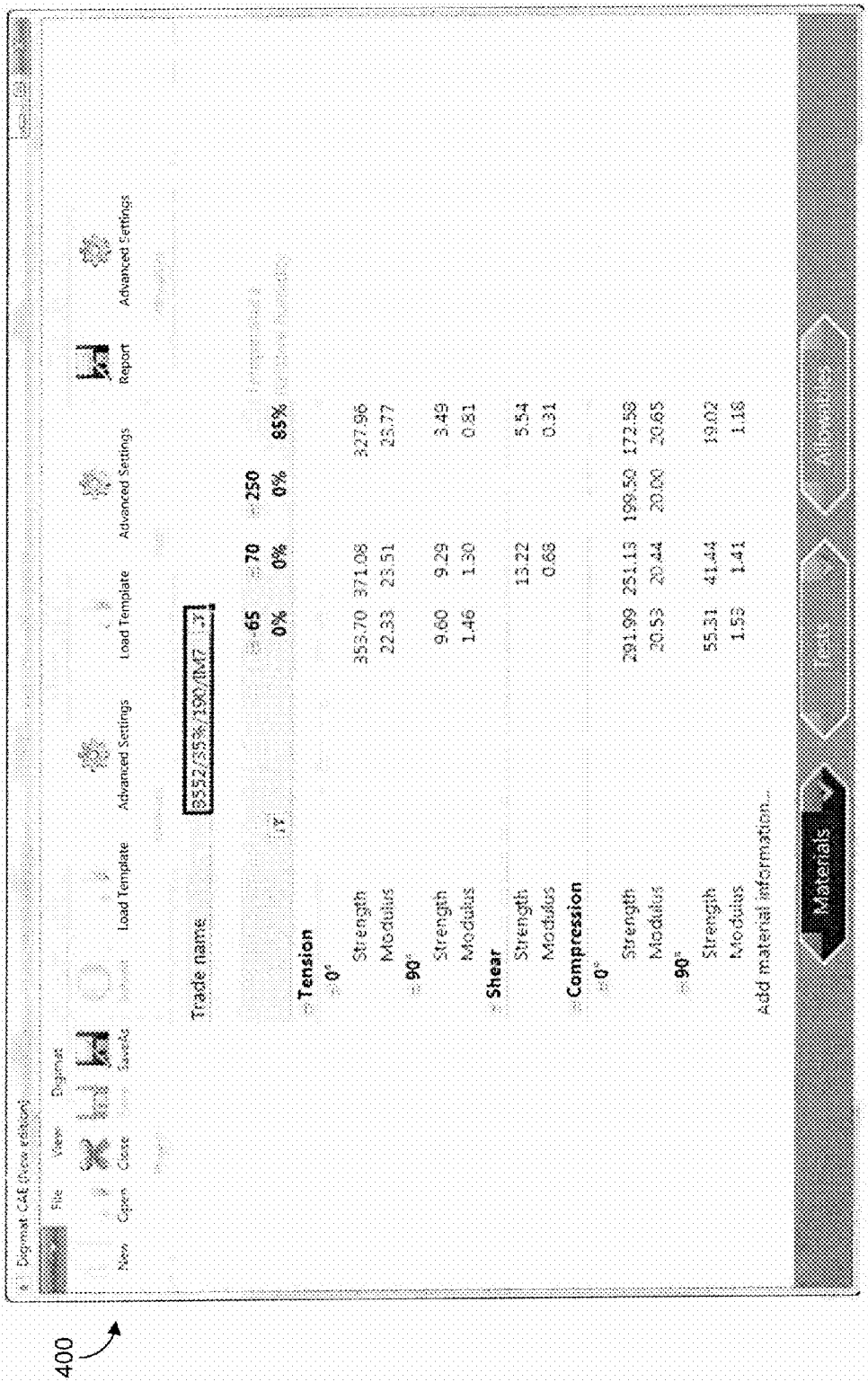
FIG. 4 is an example user interface illustrating a process of providing composite material information, according to an exemplary embodiment.
Figure 5:
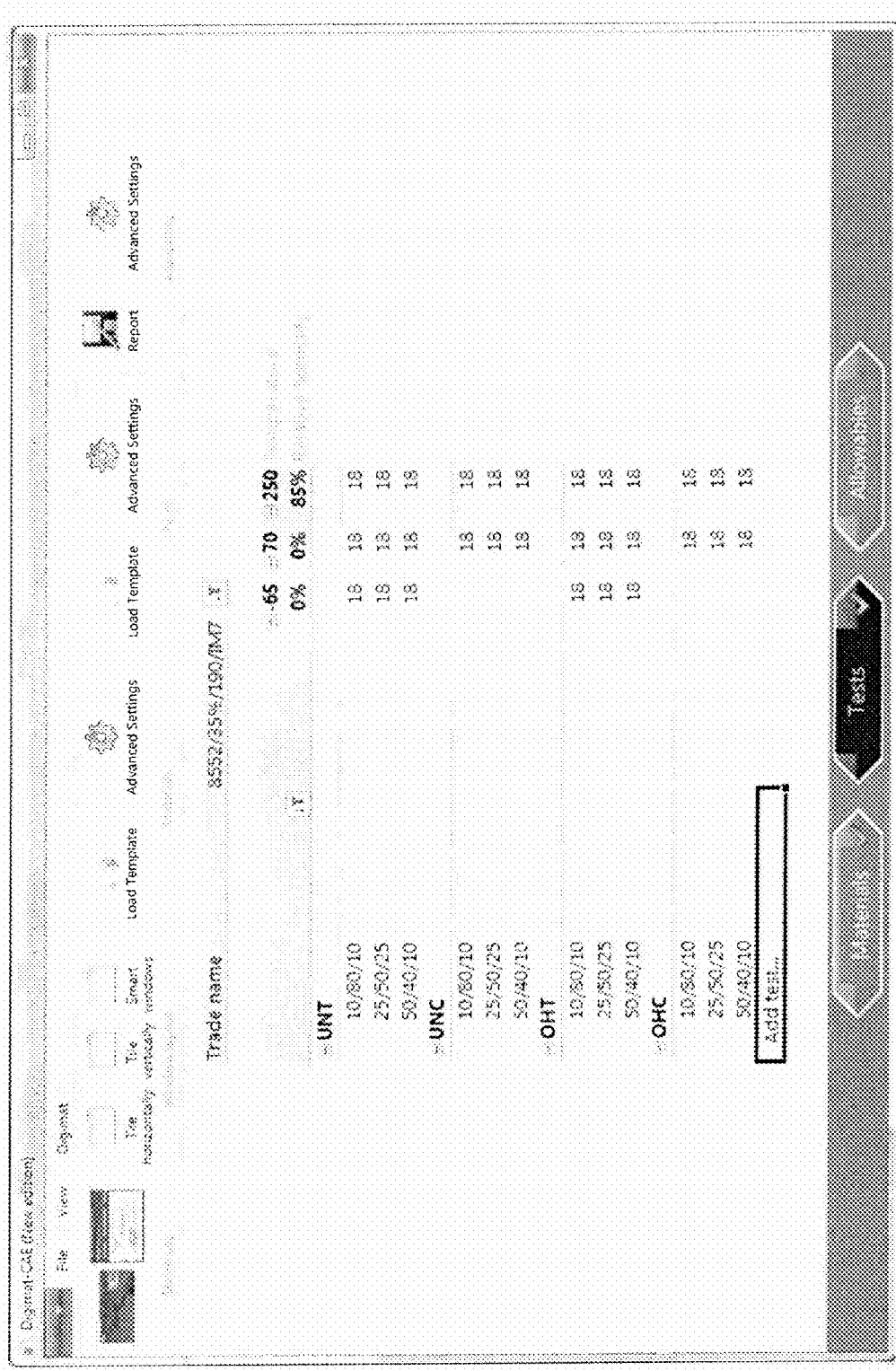
FIG. 5 is an example user interface illustrating a process of providing a test matrix, according to an exemplary embodiment.
Figure 6:
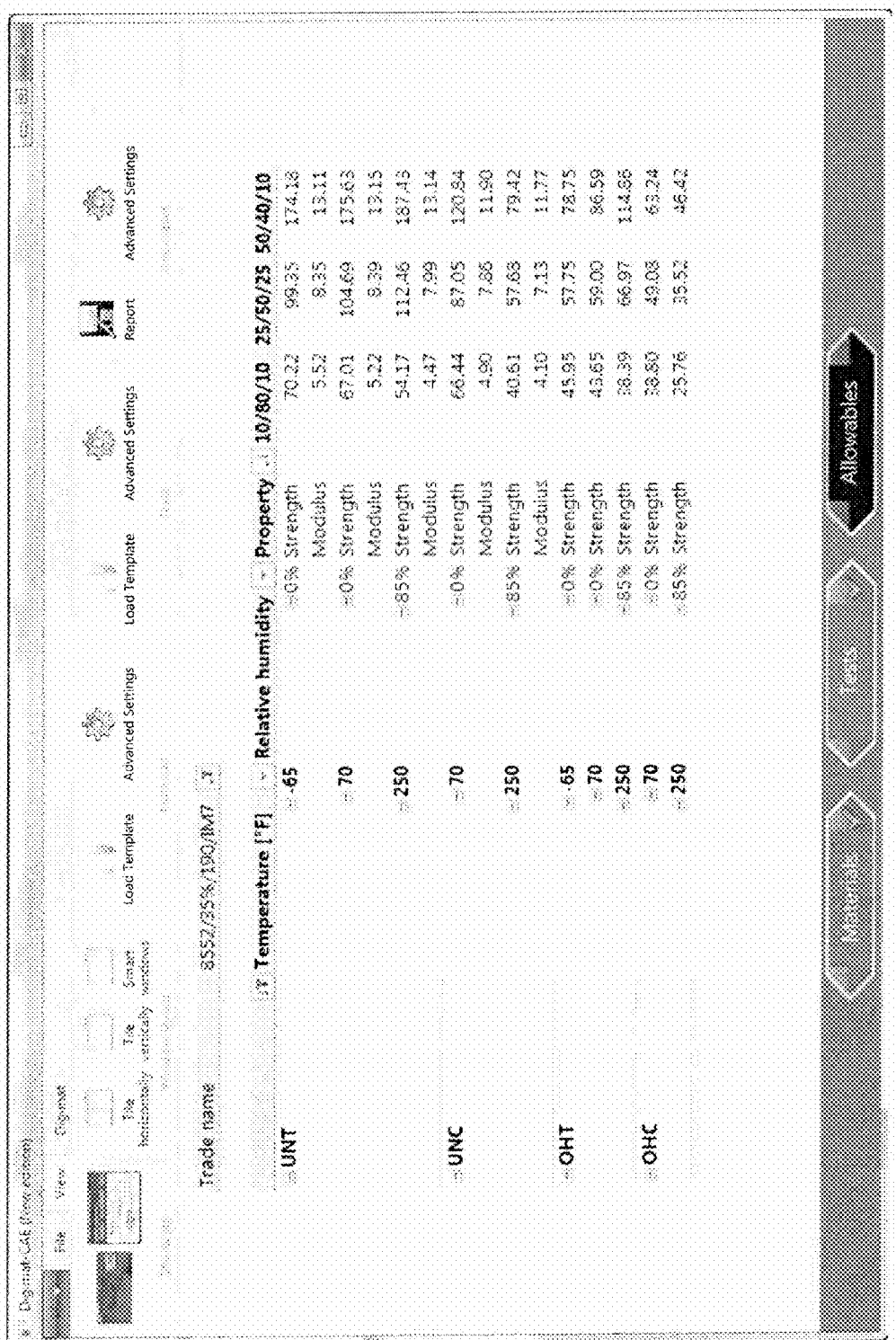
FIG. 6 is an example user interface displaying allowables information to a user, according to an exemplary embodiment.

UI module 112 may further be configured to generate a user interface for FEM system 102. Referring also to FIGS. 4-6, example user interfaces that may be generated by UI module 112 are illustrated. The user interfaces can be provided on display device 106.

The user may provide information relating to a composite material using input device 104. The composite material includes the constituent materials of the composite material and the architecture of the composite material. The constituent materials may generally include the fibers or other materials comprising the composite material, and a matrix detailing properties of the composite material. The architecture of the composite material details the layout of the model (e.g., the number of plies, orientation of each ply in the model, configuration of the fibers in each ply, etc.). The material information may include information relating to the type of material, any constraints associated with the material, and any other known properties of the material that may impact simulation of the material. The information relating to the composite material may generally include physical allowables for the composite material based on the constituent materials and architecture.

The user may also provide test data. Test data may include data relating to previous testing of the material, testing of the material that occurred outside of the software associated with FEM system 102, or otherwise. The test data may relate to the particular constituent materials and architecture of the composite material, and the associated physical allowables. The test data may correspond with the constituent materials and one or more architectures of the composite model. The physical/measured data may be used as an input for a given set of constituent materials (e.g. a given epoxy grade and a given carbon fiber type) and a given set of architecture (or layup/laminate). Based on the received input the system may compute an output the virtual allowables for the same constituents but different set of architecture (or layup/laminate).

The user may also provide a test matrix. The test matrix may generally identify one or more desired tests to run on the material. The tests may be applied to the received composite material with different architectures. In other words, the tests are applied for various configurations of the same composite material. In one embodiment, the test matrix may be a template test matrix based on general standards relating to the material testing. As one example, the test matrix may be based on the Composite Materials Handbook (CMH-17). Example tests may include unnotched tension (UNT) testing, unnotched compression (UNC) testing, open-hole compression (OHC) testing, open-hole tension (OHT) testing, filled-hole tension (FHT) testing, filled-hole compression (FHC) testing, in-plane shear (IPS) testing, bearing testing such as single shear bearing (SSB) testing, interlaminar tension (ILT) testing, double cantilever beam (DCB) testing, end notched flexure (ENF) testing, compression after impact (CAI) testing, etc. It should be understood that the systems and methods herein may be implemented regardless of the type of tests identified by the test matrix.

FEM system 102 is shown to include reverse engineering module 114 according to one embodiment. Reverse engineering module 114 may be configured to receive material information and test data from input device 104 and to use the material information and test data to generate nonlinear micromechanical models and associated micromechanical material properties. Reverse engineering module 114 may include one or more tools for handling micromechanical material models (e.g., Digimat). These material models may rely on one or more methods such as multi-scale modeling, mean-field homogenization, or progressive failure.

In one embodiment, FEM system 102 may include a composite materials database that includes material files already reverse engineered (e.g., files from Digimat-MX), and may use such files to help build the micromechanical models (e.g., the material information and test data may be cross-referenced with the database to select the one or more files most relevant to the model). The material files may generally be files that include material information and data and identify the functionality and properties of the model based on said data.

Depending on the information provided by the user at input device 104, reverse engineering module 114 may be configured to use an uncertainty quantification to account for some parameters to be involved in the simulation of the model at a later step. For example, if a property or input parameter for the material is not accurately known (e.g., a physical allowable not provided at input device 104), the uncertainty quantification may be used to estimate the impact of the input parameter accuracy on the simulation. Such a process may generally take into account the manufacturing process as the manufacturing process includes dependency on various properties of the model (e.g., fiber orientation, content, porosity, etc.). The process allows a set of virtual allowables to be determined using the same constituent materials of the composite model in a different architecture.

FEM system 102 is shown to include coupon meshing module 116. Coupon meshing module 116 may generally define one or more test specimens or coupons corresponding to the chosen tests defined in the test matrix and meshes the coupons. A meshed coupon may generally refer to a numerical 3D model of the physical object and the discretization of the object in a finite number of smaller elements or geometrical entities. As a result of the activities of coupon meshing module 116, the model may be meshed and ready for simulation and analysis.

FEM system 102 is shown to include finite element model generation module 118. Finite element model generation module 118 may generally be configured to generate one or more finite element models integrating the micromechanical material properties determined at module 114 and based on the meshed models generated at step 116. Finite element model generation module 118 may generate the models corresponding to the chosen virtual tests to be run on the material. Finite element model generation module 118 may generate parameters for the model including loading, constraint, material model, and solver parameters. These parameters may be adapted to a finite element solver, such as but not limited to, Abaqus®, ANSYS®, LS-DYNA®, Marc®, MSC Nastran®, PAM-CRASH®, RADIOSS®, SAMCEF®, etc. They may also be adapted to the coupled use of a finite element solver and a material modeling software, such as Digimat.

FEM system 102 is shown to include finite element model analysis module 120. Finite element model analysis module 120 may be configured to perform analysis on the models corresponding to the chosen virtual tests. Finite element model analysis module 120 may utilize a finite element solver and a material modeling software, such as the ones mentioned above. Finite element model analysis module 120 may generate results files to be used in post processing to determine allowables.

FEM system 102 is shown to include allowables module 122. Allowables module 122 may be configured to generate a set of virtual allowables of the material based on the results of the analyses of the finite element models. In one embodiment, allowables module 122 may generate a report for the virtual allowables in concert with UI module 112. The report may generally include information relating to material properties such as stiffness, strength, stress or strain spatial distribution, thermal or electrical conductivity, etc. In other words, the report identifies information relating to the material that indicates various tolerance levels for the material for various conditions. The virtual allowables information may include information for the composite material with different architectures. In other words, for various configurations of the composite material, virtual allowables are determined for the plurality of architectures at allowables module 122.

FEM system 102 further includes one or more databases for storing physical and virtual allowables. In one embodiment, FEM system 102 may include a virtual allowables database 124 and physical allowables database 126. Databases 124 and 126 may generally store allowables information for composite materials. With reference to the systems and methods described herein, FEM system 102 determines virtual allowables (e.g., allowables based on simulations of the composite materials). The virtual allowables are stored in virtual allowables database 124 for further use. For example, after determining allowables for a material, the process for determining allowables may be run again, additionally using the allowables stored in database 124. In other words, FEM system 102 may be a self-learning system in which previous allowables information is used to determine new allowables information for the same material or a new material.

Physical allowables database 126 may be a database storing allowables information determined based on previous physical tests. Such allowables may be determined over the course of a long period of time (e.g., months) and over a large number of tests (e.g., in the tens of thousands). Physical allowables may be used in conjunction with virtual allowables to determine allowables for a composite material.

While the embodiment shown in FIG. 1 illustrates two individual databases 124, 126, it should be understood that in other embodiments, FEM system 102 may include a single database in which both virtual and physical allowables are stored. For example, a single database 123 may be included in FEM system 102 that stores both virtual and physical allowables. The allowables may be stored in database 123 and be tagged as either physical allowables or virtual allowables. In yet other embodiments, FEM system 102 may include any number of databases, or databases 123, 124, 126 may be located remotely from FEM system 102.

Referring generally to data processing system 100 activity, the computing resources of system 100 may be adapted based on the request for allowables by the user. The amount of computing resources used by system 100 (e.g., how many computers, processors, etc.) may be adjusted based on a request from the user based on how much time the user is willing to wait for a result and on the amount of available resources in system 100. Since system 100 may run several computations (e.g., several model simulations) simultaneously, system 100 may be configured to manage available resources to obtain results as efficiently as possible. For example, the computations may be executed with an acceptable approximation level (e.g., precision) and at a requested detail level (e.g., provide allowables results at the laminate, ply, or constituent level of the model).

Figure 2:
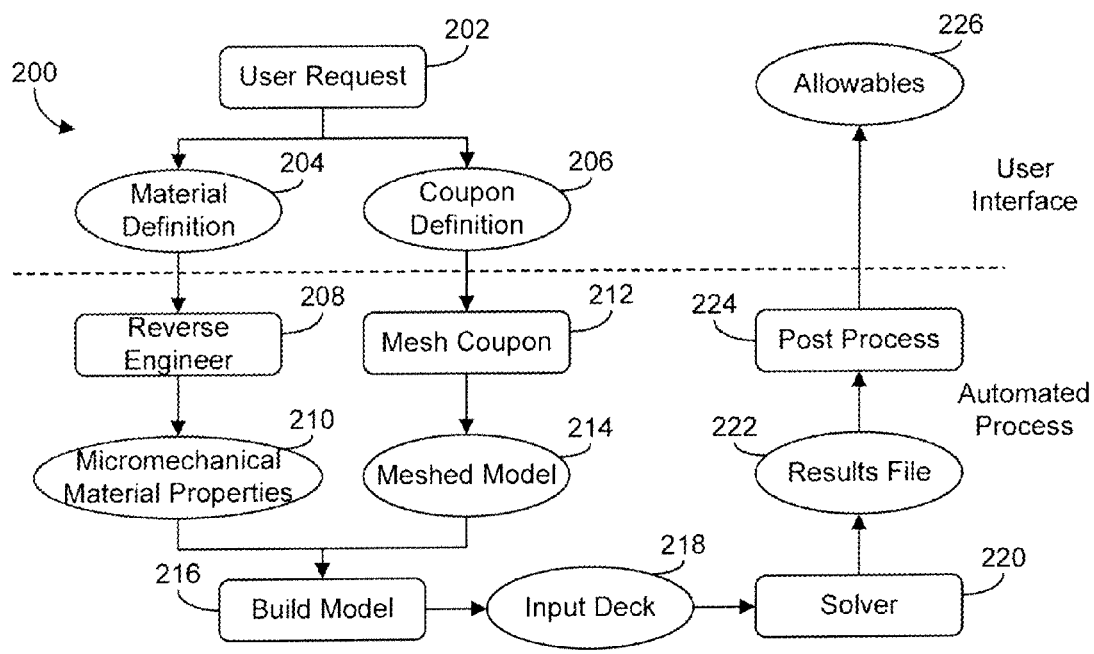
FIG. 2 is a flow chart of a process for determining virtual design allowables of a composite material created using the FEM system, according to an exemplary embodiment.

Referring also to process 200 of FIG. 2, the activities of FEM system 102 are illustrated in a step-by-step process. The user may begin process 200 by requesting FEM system 102 to determine virtual allowables for one or several tests defined in a test matrix (step 202). Upon the user request, a material definition 204 is provided to FEM system 102. The material definition may generally include material information and test data. The material information may include constituent properties, architecture information, and existing experimental test data, and may be provided by the user or extracted from one or more databases or other sources.

Reverse engineering module 114 uses material definition 204 to determine micromechanical material properties 210 (step 208). For example, reverse engineering module 114 may use the data and material properties in the reverse engineering process to generate a model including the appropriate micromechanical material properties. Reverse engineering module 114 may use uncertainty quantification to account for the variability in the properties.

For each test defined in the test matrix, the user request also results in a coupon definition 206 being provided to FEM system 102. Coupon meshing module 116 generates a meshed model 214 ready for simulation and analysis using coupon definition 206 (step 212). Coupon definition 206 may generally correspond to the test defined in the test matrix and other test information relating to the type of test to be performed on the material.

For each test defined in the test matrix, micromechanical material properties 210 and meshed model 214 are provided to finite element model generation module 118 for building the model (step 216). The built model corresponds to the chosen virtual test identified by the test matrix, including loading, constraint, material model, and solver parameters.

For each test defined in the test matrix, the built model 218 may be provided to finite element model analysis module 120 for analysis (e.g., the solver of FEM system 102 is run) (step 220). Finite element model analysis module 120 may adapt the function framework of data processing system 100 to meet a requested timeframe by the user and to account for available computing resources.

For each test defined in the test matrix, finite element model analysis module 120 may generate a results file 222 with the results of the analysis in one embodiment. The results file 222 is processed (step 224) to determine a set of virtual allowables 226 to be provided to the user via the user interface in one embodiment. The set of virtual allowables may be provided to the user via a template or other report format. Virtual allowables may generally include material properties such as stiffness, strength, etc. in one embodiment.

Figure 3:
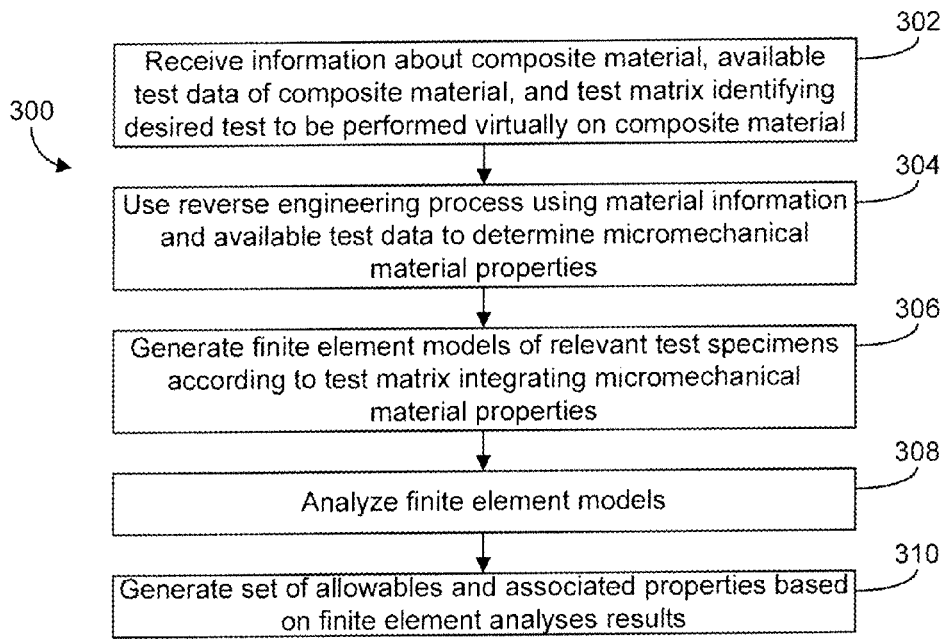
FIG. 3 is a flow chart of a process for determining virtual design allowables of a composite material created using the FEM system, according to another exemplary embodiment.

Referring now to FIG. 3, FIG. 3 is a flow chart of a process 300 for generating a set of virtual allowables for a composite material, according to an exemplary embodiment. Process 300 may be executed by a FEM system or any other system configured to generate and analyze a composite material.

Process 300 includes receiving information and available test data of a composite material, and a test matrix identifying the desired tests to perform virtually on the material (step 302). A user may provide the information by a user interface (e.g., the user interfaces of FIGS. 4-6) in one embodiment. The information may generally include constituent material information and architecture information. Material information may include information relating to the type of material, any constraints associated with the material, and any other known property of the material that may impact simulation of the material, while architecture information relates to the configuration of the composite material. Test data may include data relating to previous testing of the material, testing of the material that occurred outside of the software, or otherwise. The test matrix may generally identify one or more desired tests to run on the material.

Process 300 further includes using a reverse engineering process using the material information and available test data to determine micromechanical properties (step 304). In other words, step 304 includes using the material information and test data to generate nonlinear micromechanical models of the material and associated micromechanical material properties. In one embodiment, the reverse engineering process may include using the material information and test data available from a database and generating one or more files stored in the same or another database. The one or more files are material files that are reverse engineered (e.g., files that define nonlinear micromechanical models calibrated on the user-provided data).

Process 300 further includes generating finite element models of relevant test specimens according to the test matrix integrating the micromechanical material properties (step 306).

The finite element models are analyzed (step 308) to generate results files. The results files may be processed to generate a set of virtual allowables and associated properties based on the finite element analysis results (step 310).

Referring generally to FIGS. 4-6, various user interfaces are illustrated that show the process of determining virtual design allowables for a composite material from the perspective of the user of the FEM system. Referring to FIG. 4, user interface 400 may be provided to a user that allows the user to specify constituent material information of the composite material. The information may generally represent the known physical allowables of the composite material for the given constituent material information and architecture. For example, in user interface 400, the user may specify material information such as desired tension strengths and moduli in various directions for the material that indicate its stretchability, possibly anisotrophic, at given temperatures and humidity, desired shear strengths and moduli at given temperatures and humidity, and compression strengths and moduli in various directions that indicate the compressibility of the material, possibly anisotropic, at given temperatures and humidity.

Referring to FIG. 5, user interface 500 may be provided to a user that allows the user to specify a test matrix defining the tests to be performed virtually. The test matrix may be extended by a user via the "Add test" option, may be manually entered or edited, or may be provided in any other way by the user (e.g., through predefined templates). As shown in user interface 500, the user requests various tests for the material at different temperatures and humidity.

Referring to FIG. 6, user interface 600 is an example user interface provided to a user after allowables have been determined by the FEM system. The set of allowables represent tolerance values for one or more material properties such as stiffness, strength, stress or strain spatial distribution, thermal or electrical conductivity, etc. For example, in user interface 600, allowables are provided for various properties based on different temperatures, humidity, and other types of properties. These virtual allowables are allowables for the given composite material with different architectures.

Configurations of Various Exemplary Embodiments

The terms "system", "logic", "data processing apparatus" or "computing device" encompasses all kinds of circuits, apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, networked systems or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions may be executed on any type of computing device (e.g., computer, laptop, etc.) or may be embedded on any type of electronic device (e.g., a portable storage device such as a flash drive, etc.).

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for determining virtually a set of design allowables for a first set of architectures of a composite material, comprising: receiving composite material information, wherein the composite material information comprises information about the composite material and the first set of architectures, available test data of the composite material associated with a second set of architectures, and a test matrix identifying desired tests to be performed virtually on the composite material with the second set of architectures; determining micromechanical material properties based on a reverse engineering process using the composite material information and the available test data associated with the second set of architectures; generating finite element models of relevant test specimens according to the test matrix associated with the second set of architectures integrating the micromechanical material properties; analyzing the finite element models to obtain finite element analysis results; generating the set of allowables and associated properties for the first set of architectures of the composite material based on the finite element analysis results; storing the set of allowables in a database, wherein the set of allowables in the database is used in a design process for the composite material, the design process being a part of a manufacturing process based on the first set of architectures; and defining limits of a structure corresponding to the first set of architectures based on the set of allowables, wherein the structure is made of the composite material; wherein the set of allowables and the limits for the structure are used in the manufacturing process of the structure.

2. The method of claim 1, wherein at least some of the composite material information is specified by a user via a user interface.

3. The method of claim 1, wherein the reverse engineering process comprises using an uncertainty quantification to account for the variability of the composite material information needed for the reverse engineering process.

4. The method of claim 1, wherein the test matrix is defined from templates obtained from one or more sources defining standards for material testing.

5. The method of claim 1, further comprising:
defining one or more meshed coupons corresponding with the test matrix;
wherein the one or more meshed coupons are numerical model representations of the relevant test specimens made of the composite material;
wherein the one or more meshed coupons are used to generate the finite element models.

6. The method of claim 1, further comprising:
generating a report comprising the set of allowables;
wherein the report is displayed on a user interface for the user.

7. The method of claim 1, wherein the set of allowables is used as new composite material information to determine a new set of allowables using the same composite material in a third set of architectures different from the first set of architectures.

8. A finite element method (FEM) system, comprising a processing circuit configured to: receive composite material information, wherein the composite material information comprises information about a composite material and a first set of architectures, available test data of the composite material associated with a second set of architectures, and a test matrix identifying desired tests to be performed virtually on the composite material with the second set of architectures; determine micromechanical material properties based on a reverse engineering process using the composite material information and the available test data associated with the second set of architectures; generate finite element models of relevant test specimens according to the test matrix associated with the second set of architectures-integrating the micromechanical material properties; analyze the finite element models to obtain finite element analysis results; generate a set of allowables and associated properties for the first set of architectures of the composite material based on the finite element analysis results; store the set of allowables in a database, wherein the set of allowables in the database is used in a design process for the composite material, the design process being a part of a manufacturing process based on the first set of architectures; and define limits of a structure corresponding to the first set of architectures based on the set of allowables, wherein the structure is made of the composite material; wherein the set of allowables and the limits for the structure are used in the manufacturing process of the structure.

9. The system of claim 8, wherein at least some of the composite material information is specified by a user via a user interface.

10. The system of claim 8, wherein the reverse engineering process comprises using an uncertainty quantification process to account for the variability of the composite material information needed for the reverse engineering process.

11. The system of claim 8, wherein the test matrix is defined from templates obtained from one or more sources defining standards for the material testing.

12. The system of claim 8, wherein the processing circuit is further configured to:
define one or more meshed coupons corresponding with the test matrix;
wherein the one or more meshed coupons are numerical model representations of the relevant specimens made of the composite material;
wherein the one or more meshed coupons are used to generate the finite element models.

13. The system of claim 8, wherein the processing circuit is further configured to:
generate a report comprising the set of allowables;
wherein the report is displayed on a user interface for the user.

14. The system of claim 8, wherein the processing circuit stores the set of allowables in the database by:
storing the set of allowables in a first database;
wherein the set of allowables in the first database and a second set of allowables in a second database are used in a design process for the composite material;
wherein the second set of allowables are physical allowables based on previous test data of the composite material.

15. The system of claim 8, wherein the set of allowables is used as new composite material information to determine a new set of allowables.

16. A non-transitory computer readable medium containing program instructions, wherein execution of the program instructions by one or more processors of a computer system causes the one or more processors to carry out a method comprising: receiving composite material information, wherein the composite material information comprises information about a composite material and a first set of architectures, available test data of the composite material associated with a second set of architectures, and a test matrix identifying desired tests to be performed virtually on the composite material with the second set of architectures; determining micromechanical material properties based on a reverse engineering process using the composite material information and the available test data associated with the second set of architectures; generating finite element models of relevant test specimens according to the test matrix associated with the second set of architectures integrating the micromechanical properties; analyzing the finite element models to obtain finite element analysis results; generating a set of allowables and associated properties for the first set of architectures of the composite material based on the finite element analysis results; store the set of allowables in a database, wherein the set of allowables in the database is used in a design process for the composite material the design process being a part of a manufacturing process based on the first set of architectures; and defining limits of a structure corresponding to the first set of architectures based on the set of allowables, wherein the structure is made of the composite material; wherein the set of allowables and the limits for the structure are used in the manufacturing process of the structure.

17. The non-transitory computer readable storage medium of claim 16, wherein the reverse engineering process comprises using an uncertainty quantification to account for the variability of the composite material information needed for the reverse engineering process.

18. The non-transitory computer readable storage medium of claim 16, wherein the steps further comprise:
  generating a report comprising the set of allowables;
  wherein the report is displayed on a user interface for the user.

19. The non-transitory computer readable storage medium of claim 16, wherein the one or more processors is caused to store the set of allowables in the database by:
  storing the set of allowables in a first database;
  wherein the set of allowables in the first database and a second set of allowables in a second database are used in the design process for the composite material;
  wherein the second set of allowables are physical allowables based on previous test data of the composite material.

* * * * *